(12) United States Patent
Khan

(10) Patent No.: US 7,041,329 B2
(45) Date of Patent: *May 9, 2006

(54) FAST COOKING FLOURS

(76) Inventor: Sajid Ali Khan, 2 Union Pl., Ridgefield Park, NJ (US) 07660

( * ) Notice: Subject to any disclaimer, the term of this patent is extended or adjusted under 35 U.S.C. 154(b) by 405 days.

This patent is subject to a terminal disclaimer.

(21) Appl. No.: 10/403,923

(22) Filed: Mar. 24, 2003

(65) Prior Publication Data

US 2003/0203092 A1 Oct. 30, 2003

Related U.S. Application Data

(63) Continuation-in-part of application No. 09/781,514, filed on Feb. 12, 2001, now abandoned.

(51) Int. Cl.
*A23L 6/00* (2006.01)

(52) U.S. Cl. .................... 426/622; 426/520; 426/523

(58) Field of Classification Search ................ 426/622, 426/520, 523
See application file for complete search history.

(56) References Cited

OTHER PUBLICATIONS

ACS on STN No. 45:30696 Quick-cooking legume meal or flour, Neleman, Hendrick NL 65985 19500715 (unavailable).*
Derweant-Acc-No:2001-172856, Derwent Week: 200118 Cereal grain.*

* cited by examiner

*Primary Examiner*—Helen Pratt

(57) ABSTRACT

Fast cooking flours for making breads, cakes, pancakes, biscuits, tortillas, muffins, cookies, patties, pizzas, nans, brioches, etc. by heat treating the grain which is dry heated for a time and duration which is then ground into flour which can be used in flour containing products which provide a faster cooking product than using conventional flour.

4 Claims, No Drawings

FAST COOKING FLOURS

This application is a continuation-in-part of Ser. No. 09/781,514 filed Feb. 12, 2001, now abandoned.

FEDERALLY SPONSORED RESEARCH

Not Applicable

SEQUENCE LISTING OR PROGRAM

Not Applicable

REFERENCE TO A "MICROFICHE APPENDIX"

Not Applicable

BACKGROUND OF INVENTION

1. Field of Invention

This invention relates to creating fast cooking flours.

2. Desciption of Related Art

A prior Art exists in relation to this invention. JP41042778, Rodriguez ES2017138, Ab263897 and GB228829 all teach a mixture of cooked and uncooked flour to enhance the flavor of the flour. However, the problem with these resultant flours is that the precooked part tends to overcook and the raw part still needs 100% time to cook fully. While my fast cooking flour is 100% partly cooked. Thus it requires less time to make the end product from my fast cooking flour.

Baker et al [U.S. Pat. No. 5,902,629] teaches a method for processing grain and legunie fully cooked powders and snacks. Bakers fully cooked flour will have no need to be cooked so it will have even more advantages of saving time and no pollution of the enviornment, over this applicant's application. However, Baker's flours purpose is limited. As it cannot be used in cooking flour containing products selected from the group consisting of breads, muffins, cakes, pizza, cookies, biscuits, brioches, tortillas, nans, and pancakes. As using the fully cooked Baker flour will result in overcooked bread etc. No prior art exists so far in relation to fast cooking flours.

BRIEF SUMMARY OF INVENTION

The present invention relates to making available to the consumer fast cooking flours. I have discovered that any and all kind of flours available in the market can be partly precooked and made available to the consumer. Partly cooked flours have several advantages over what is available in the market today. Partly cooked flours save time, labor, fuel, money, materially enhance the quality of the environment, and enhance the flavor as well as prolong the life of the flour. Consider the following:

a) The grain for making the flour will be partly-baked in large commercial facilites; thus the damage to the environment will be minimum, as the pollution will be controlled through efficient filters.

b) As the flour will already be partly-cooked people will spend less time making bread and will have more time for their families.

c) Less work will mean less tiredness and more rest etc.

d) As bread tends to over cook on the outside and usually remains under cooked on the inside it will now be possible to cook the bread more evenly, enhancing the flavor of the bread. Same will happen with all other flour products.

e) As the partly-baked flour will contain less moisture, it will be more seasoned than the raw flour and will last longer.

f) Commercial quantites of fast cooking flours can be made where fuel is cheap and available in large quantities.

g) Not just bread, but also everything that is made with conventional flour can be made with fast cooking flour and will have the same above advantages.

h) It has now been discovered that carmalization of bread causes cancer. Thus, fast cooking flours are more healthy. All other flours mentioned in the prior art cause some carmalization.

DETAILED DESCRIPTION OF THE INVENTION

The present invention relates to making available to the consumer fast cooking flours. The method of making the flour is to take the wheat grain or any other grain of which the flour is to be made and subject it to heat of 200 degrees F. for four hours in a closed vessel, the grain is then ground and the fast cooking flour is obtained. When the grain is subjected to a higher temperature, say 300 degrees F. the resultant grain when ground into flour is not of the same quality in flavor. However, the other benefits remain the same.

The resultant flour obtained by subjecting the grain to 200 degrees F. for four hours is good for making end products that do not require streching of the dough. For products that require streching of the dough like pizza, pie crust, nan, chappati and torillas the grain will have to be subjected to 200 degrees F. for two hours only. Thus there will be two categories of fast cooking flours. One will be almost half-baked and the other quarter-baked.

Fast cooking flours may also be produced by any one of the relevant processes described in previous U.S. patents. The material may also be made into fast cooking flour by partly cooking the desired cereal grain by using any suitable low moisture cooking method, inculding microwave and infrared energy.

Each and every flour that is available in the market today can be made into fast cooking flour before marketing. From single grain to multigrain, from the finely ground to the course, everything remains the same, except that it is partly cooked. Pastry flour, all-purpose flour, high gluten flour, whole wheat flour, bread flour, pancake flour, cassava flour, buckwheat flour, bran flour, soybean flour, barley flour, corn flour, oats flour, rye flour, rice flour, millet flour, etc. each and every kind of end product like cakes, pancakes, bread tortillas, chappaties, pizzas, nachos, nans, brioches, muffins, cookies, etc, can all be made with fast cooking flours.

French brioches were made with fast cooking flour. At a temperature of 370 degrees F. it took 17 minutes to bake. The same made with regular flour at the same temperature took 37 minutes to bake. Again corn biscuits were made with fast cooking corn flour. At a temperature of 375 degrees F. it took 12 minutes to bake. Corn biscuits made with conventional corn flour at the same temperature took 22 minutes to bake. Wheaten bread was made with fast cooking bread flour. At a temperature of 425 degrees F. it took 18 minutes to bake. With regular bread flour at the same temperature it took 35 minutes. In all three cases the flavor was much better. Also there was no carmalization of the outter shell when cooked with fast cooking flour in all three cases.

The invention claimed is:

1. A process of preparing a fast cooking partly cooked flour from any cereal grain wherein said cereal grain is heated to a temperature of at least 200 degrees F. for about 4 hours, grinding said cereal grain into flour.

2. A process of preparing fast cooking partly cooked flour from any cereal grain wherein said cereal grain is heated to a temperature of at least 200 degrees F. for about two hours, grinding said cereal grain into flour.

3. A process of using the fast cooking flour of claim 1 or 2, in flour containing food products selected from the group consisting of breads, muffins, cakes, pizza, cookies, biscuits , brioches, tortillas, nans, and pancakes, wherein flour containing food products cook in less time than food products made from conventional flours.

4. A process of preparing as in claim 1 or 2, fast cooking flours further compromising using microwave or infrared energy.

* * * * *